Nov. 15, 1960   C. F. ENGSTROM ET AL   2,960,139
PNEUMATIC TIRE

Filed April 24, 1959   2 Sheets-Sheet 1

INVENTOR.
CARL F. ENGSTROM
BY WILLIAM J. SHEVOCK

Charles A. Blank
ATTORNEY.

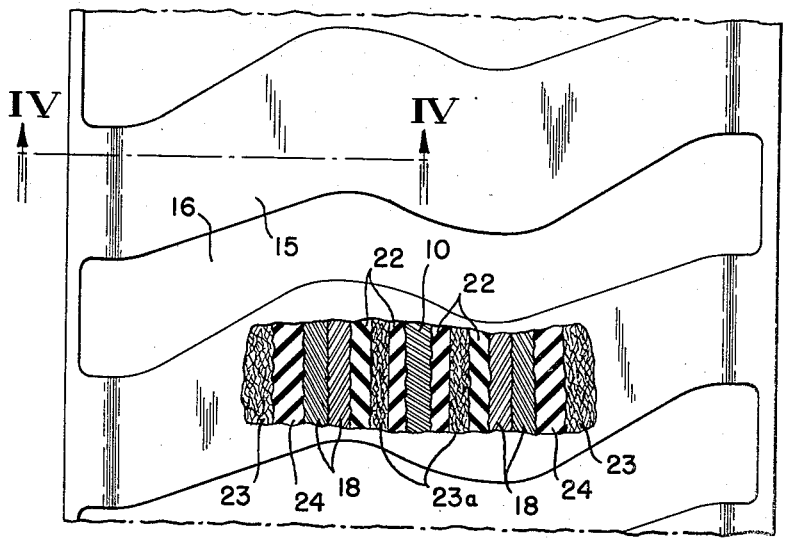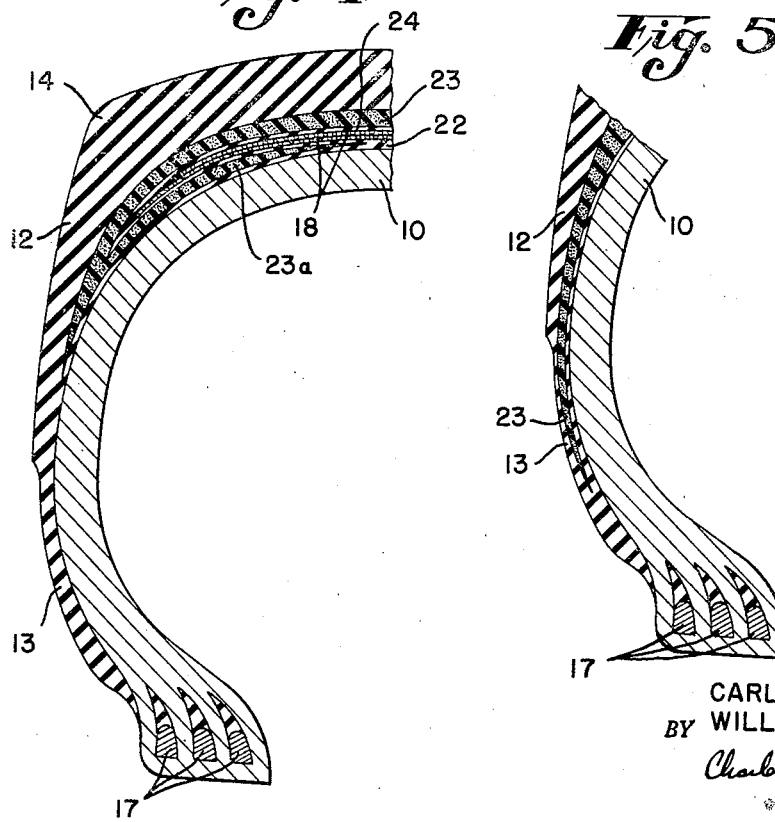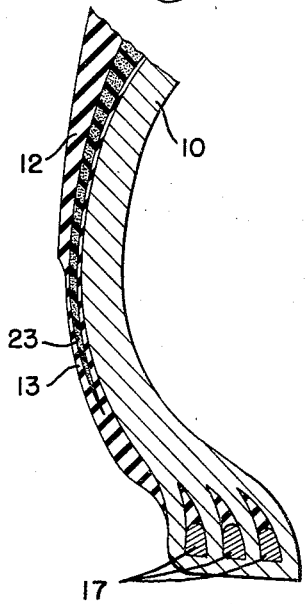

United States Patent Office 2,960,139
Patented Nov. 15, 1960

2,960,139

PNEUMATIC TIRE

Carl F. Engstrom and William J. Shevock, Detroit, Mich., assignors to United States Rubber Company, New York, N.Y., a corporation of New Jersey Filed Apr. 24, 1959, Ser. No. 808,670

7 Claims. (Cl. 152—354)

This invention relates to pneumatic tires and, more particularly, to tires suitable for heavy-duty, off-the-road service and capable of resisting penetration by stones, glass or other hazardous objects.

Wire breaker assemblies have heretofore been utilized in tires to provide improved resistance to penetration. We have found, however, that such breakers have certain limitations. For example, a wire breaker assembly cannot be extended into the buttress and sidewall regions of the tire because the edges of the breaker assembly separate and flex to such a degree as to split the sidewall circumferentially. We have also found that if penetration to the wire breaker assembly occurs during wet service conditions, corrosion and disintegration of the breaker assembly results. Also, occasionally small stones or other objects pass through the breaker assembly to the carcass unless the spacing of the wires in the breaker assembly is well controlled. We have found that a wire breaker assembly is very satisfactory with respect to its resistance to massive impacts and with respect to its property of restraining the tread.

We have also found that wire-reinforced tread stock comprising, for example, thousands of individual wire fragments can be combined in a tire with a wire breaker assembly to provide a tire having vastly improved resistance to penetration of all types and having a prolonged breaker assembly life.

It is an object of the present invention, therefore, to provide a new and improved pneumatic tire having improved resistance to penetration.

It is another object of the invention to provide a new and improved pneumatic tire which has good impact resistance and which is not subject to deterioration due to penetration in a wet environment.

It is another object of the invention to provide a new and improved pneumatic tire which has improved resistance to penetration in its buttress portions and which is not subject to sidewall splitting.

It is another object of the invention to provide a new and improved pneumatic tire utilizing a breaker assembly in which the breaker edges do not separate.

In accordance with the invention, a pneumatic tire comprises a carcass having rubber tread, buttress and sidewall portions adherent thereto. The tire includes a wire breaker assembly disposed in the tread portion over the crown of the carcass and a layer of wire-reinforced rubber stock disposed in the tread portion over the breaker assembly and having individual wire fragments randomly dispersed therein and extending beyond the edges of the breaker assembly and into the buttress portion of the tire.

For a better understanding of the present invention, together with other and further objects thereof, reference is made to the following description taken in connection with the accompanying drawings and its scope will be pointed out in the appended claims.

Referring to the drawings:

Fig. 3 is a plan view of a tire constructed in accordance with a modified form of the invention, partially broken away, to show the several layers of the tire;

Fig. 4 is a sectional view of the Fig. 3 tire taken on line 4—4 of Fig. 3; and

Fig. 5 is a fragmentary view in section of another modified tire also constructed in accordance with the invention.

Figure 1:
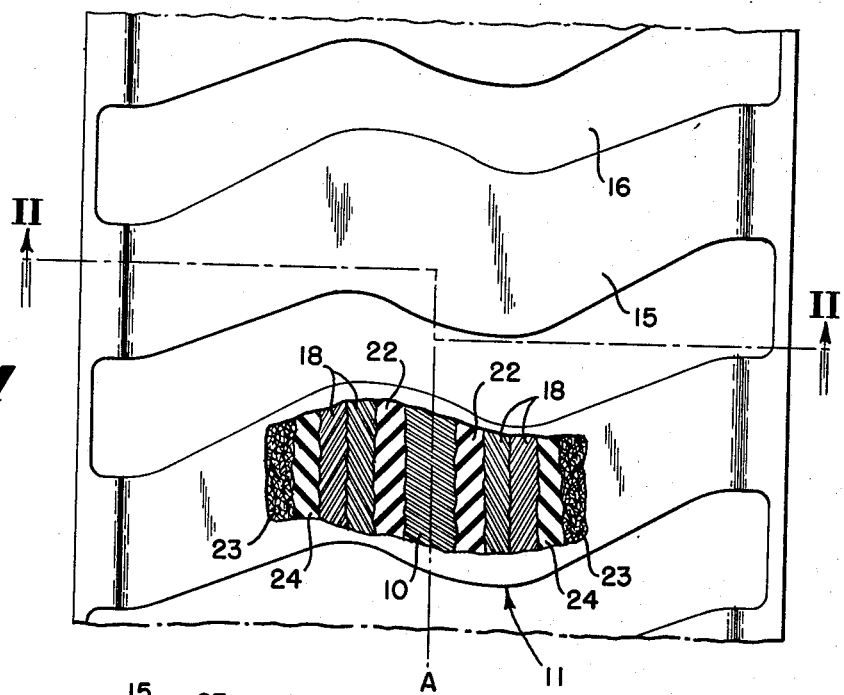
Fig. 1 is a plan view of a portion of a tire tread, partially broken away, to show the several layers of a tire constructed in accordance with the invention.
Figure 2:
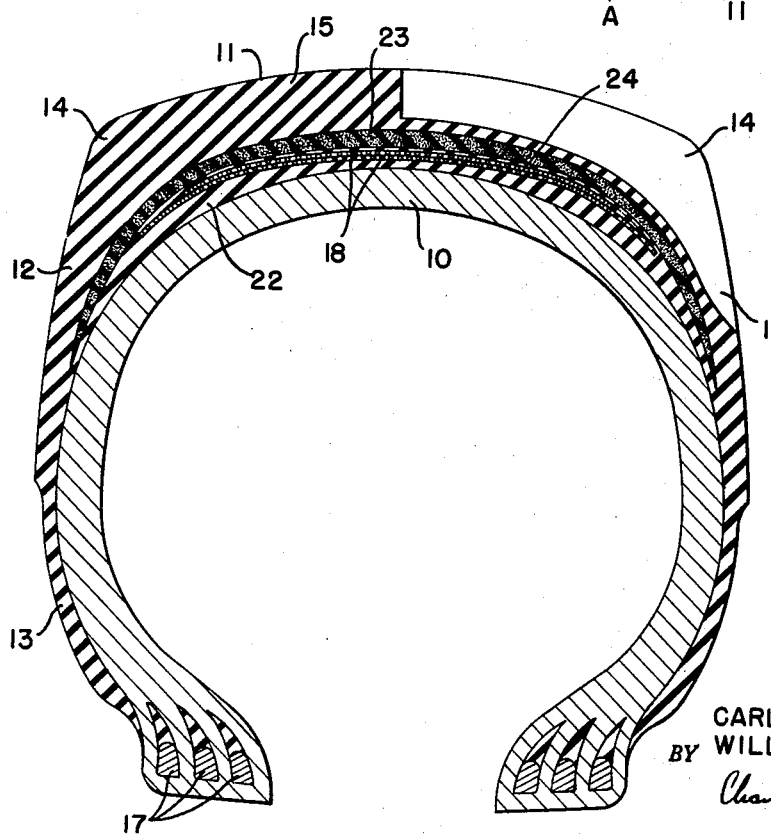
Fig. 2 is a sectional view taken along line 2—2 of Fig. 1.

Referring now more particularly to Figs. 1 and 2 of the drawings, a pneumatic tire constructed in accordance with the invention has an interior reinforcing carcass 10 having rubber tread, buttress and sidewall portions 11, 12, 13 adherent thereto. Lugs 15 and groves 16 of the outer wear surface of the tire are apparent in Fig. 1. The carcass is of conventional heavy service construction, comprising a plurality of textile cord fabric plies overlapped at their ends around inextensible wire bead assemblies 17. Each ply of cord fabric is coated on each side with rubber carcass stock so that the carcass cords are embedded in rubber, and the cords are usually given a preliminary adhesive treatment to insure good adhesion to the carcass stock. The cords in each ply proceed on a diagonal or bias from one bead of the tire to the other, along a path characterized by a definite cord angle, that is usually designated as the lesser angle at the intersection of the cord with the crown center line, indicated at A in Fig. 1, and alternate plies are disposed so that the cords run in opposite directions, for better balance.

It will be understood that the carcass is initially assembled in the flat on the surface of a collapsible tire building drum (not shown), by superimposing the required number of plies of rubberized tire fabric and incorporating the bead assemblies therewith. After the additional layers of stock, to be described subsequently, are superimposed on the carcass on the tire building drum, the carcass is expanded or shaped into typical tire or toroidal form. The expansion may be accomplished with the aid of the usual shaping box (not shown) in which a dough-nut shaped curing bag is inserted within the carcass, or with the aid of an automatic shaping and vulcanizing press containing an integral curing bag.

The carcass cord angle typically falls within the range of from 38° to 41° as measured at the crown in the finished tire. The carcass cords preferably are made of high stretch synthetic textile fibers such as rayon or nylon.

The tire includes a wire breaker assembly disposed in the tread portion 11 over the crown of the carcass and preferably extending to the buttress 12. The wire breaker assembly preferably comprises two reinforcing strips 18 made of wire tire fabric, that is, cord fabric in which the cords are essentially adjacent parallel wire cables or elements, generally made at least in part of ferrous wires, preferably steel. The wire may be treated previously to render it adhesive to rubber, and the wire cord fabric is covered on each side with a thin layer of vulcanizable rubber in essentially the same manner as textile tire fabric. The plies or strips comprising the breaker assembly are preferably equal in width to the width of the tread, that is they extend from one shoulder 14 continuously across the tire in the tread portion and terminate at the other shoulder 14 of the tire. The wire cables in the breaker strips are disposed at a definite bias, preferably within the range of from 35 to 38° in the finished tires and the cables in alternate plies run in opposite directions, for balance.

There is disposed between the inner breaker strip and the outer surface of the carcass a layer 22 of rubber stock which is proportioned to position the breaker strips. The layer 22 has a minimum thickness at the center or crown line A and gradually increases in thickness as a substantially parabolic function of the distance from the center line and achieves a maximum thickness at the shoulders and then tapers to its termination in the buttress portion. The layer 22 has no textile or equivalent reinforcement.

Because of the shape of the layer 22, the breaker assembly typically follows the rather flat contour of the tire tread surface, rather than the contour of the carcass. It will be understood that in usual present day tire constructions the curve of the crown of the carcass is not parallel or concentric with the tread surface, but instead, the tread is essentially quite flat in comparison with the more rounded crown contour of the carcass. The breaker assembly preferably is parallel to or concentric with the tread surface, and the breaker departs from the crown curve by an increasing amount at increasing distances from the center, being separated therefrom only by the layer of rubber 22.

The tire also includes a layer 23 of wire-reinforced rubber stock disposed in the tread portion over the breaker assembly and having individual wire fragments randomly dispersed and interlaced therein and extending beyond the edges of the breaker assembly and into the buttress portion of the tire. The wire-reinforced stock is compounded by adding, for example, from 25 to 35 pounds of brass-coated steel wire to 165 to 175 pounds of tread stock. The wire used may be of .006 inch diameter and in lengths from 1 to 2 inches, which break up during milling to lengths of from ¼ inch to maximum. When fabricated the layer 23 comprises thousands of rubber insulated fine brass plated steel wire filaments interlocked or interlaced to form a protective mat which provides high resistance to cutting and penetration. The layer 23 has a graduated thickness which is controlled by laying on plies of stock at predetermined areas to obtain the desired thickness. A layer 24 of tread stock is used to cover the wire breaker assembly and to separate the breakers from the wire-reinforced stock 23. The wire-reinforced stock 23 tapers to a termination in the buttress region of the tire.

As represented in Figs. 3 and 4, the wire-reinforced stock 23 may have a portion 23a extending to a tapered termination between the edge of the breaker assembly 18 and the carcass in the tread portion of the tire to aid in preventing edge separation of the breaker assembly. The maximum thickness of the portion 23a is near the shoulder region of the tire.

As represented in Fig. 5, the wire-reinforced stock layer may taper to a termination in the sidewall of the tire.

Tires constructed in accordance with the invention have several important advantages. The combination of a breaker assembly protected by a layer of wire-reinforced stock provides the important result that small objects which would otherwise penetrate the tire are prevented from reaching the breaker assembly by the wire-reinforced stock. Consequently, corrosion of the breaker assembly due to penetration of small objects during wet service conditions is prevented. The breaker assembly very effectively resists massive impacts, and thus the tire is substantially free from penetration by hazardous objects of all types. Also the wire-reinforced stock at the breaker edges resists movement of the breaker edges more than stock which is devoid of wire reinforcement. Accordingly, protection is afforded to the buttress and sidewall portions of the tire while the possibility of circumferential shoulder or buttress splitting due to flexing and separation of the edges of the breaker assembly is minimized.

Also the wire-reinforced stock extending into the buttress portions of the tire aids substantially in dissipating heat developed in the tread and buttress portions during high speed operation by conducting heat to cooler regions of the tire.

While there have been described what are at present considered to be the preferred embodiments of this invention, it will be obvious to those skilled in the art that various changes and modifications may be made therein without departing from the invention, and it is therefore, aimed to cover all such changes and modifications as fall within the true spirit and scope of the invention.

Having thus described our invention, what we claim and desire to protect by Letters Patent is:

1. A pneumatic tire comprising a carcass having rubber tread, buttress and sidewall portions adherent thereto, a wire breaker assembly disposed in said tread portion over the crown of said carcass, a layer of wire-reinforced rubber stock disposed in said tread portion over said breaker assembly comprising a multiplicity of individual wire fragments randomly dispersed therein and extending beyond the edges of said breaker assembly and into said buttress portion of the tire.

2. A pneumatic tire comprising a carcass having rubber tread, buttress and sidewall portions adherent thereto, a wire breaker assembly disposed in said tread portion over the crown of said carcass, said breaker assembly comprising a plurality of plies of wire tire fabric individually formed of rubber covered parallel wire elements, the wire elements in one ply crossing those in another ply, a layer of wire-reinforced rubber stock disposed in said tread portion over said breaker assembly comprising a multiplicity of individual wire fragments randomly dispersed therein and extending beyond the edges of said breaker assembly and into said buttress portion of the tire.

3. A pneumatic tire comprising a carcass having rubber tread, buttress and sidewall portions adherent thereto, a layer of rubber stock disposed in said tread portion over the crown of said carcass, a wire breaker assembly disposed in said tread portion over the crown of said carcass, a layer of rubber stock disposed in said tread portion over said breaker assembly, a layer of wire-reinforced rubber stock disposed in said tread portion over said breaker assembly comprising a multiplicity of closely spaced individual brass coated wire fragments randomly dispersed and interlaced therein to form a protective mat and extending beyond the edges of said breaker assembly and into said buttress portion of the tire.

4. A pneumatic tire comprising a carcass having rubber tread, buttress and sidewall portions adherent thereto, a wire breaker assembly disposed in said tread portion over the crown of said carcass, a layer of wire-reinforced rubber stock disposed in said tread portion over said breaker assembly comprising a multiplicity of rubber insulated brass plated wire fragments of various lengths randomly dispersed and interlaced therein to form a protective mat, said layer of wire-reinforced rubber stock being of maximum thickness over the crown of said carcass and extending beyond the edges of said breaker assembly and being tapered into said buttress portion of the tire.

5. A pneumatic tire comprising a carcass having rubber tread, buttress and side wall portions, a wire breaker assembly disposed in said tread portion over the crown of said carcass, a layer of wire-reinforced rubber stock disposed in said tread portion over said breaker assembly comprising a multiplicity of brass plated steel wire fragments randomly dispersed and interlaced therein to form a protective mat and extending beyond the edges of said breaker assembly and into said buttress portion of the tire, said wire-reinforced rubber stock disposed in said buttress portion also extending into said tread portion under the edges of said breaker assembly.

6. A pneumatic tire comprising a carcass having rubber tread, buttress and sidewall portions, a wire breaker assembly disposed in said tread portion over the crown of said carcass, a layer of wire-reinforced rubber stock disposed in said tread portion over said breaker assembly comprising a multiplicity of brass coated wire fragments randomly dispersed and interlaced therein to form a protective mat and extending beyond the edges of said breaker assembly and into said buttress and sidewall portions.

7. A pneumatic tire comprising a carcass having rubber tread, buttress and sidewall portions adherent thereto, a first layer of rubber stock disposed in said tread portion over the crown of said carcass, a wire breaker assembly disposed in said tread portion over said layer of rubber stock, said breaker assembly comprising two plies of wire tire fabric individually formed of rubber-covered parallel wire elements, the wire elements in one ply crossing those in the other ply, a second layer of rubber stock disposed in said tread portion over said breaker assembly, a layer of wire-reinforced rubber stock disposed in said tread portion over said second layer comprising a multiplicity of brass coated wire fragments randomly dispersed and interlaced therein to form a protective mat, said layer of wire-reinforced rubber stock being of maximum thickness over the crown of said carcass and extending beyond the edges of said breaker assembly and being tapered into said buttress portion of the tire.

References Cited in the file of this patent

UNITED STATES PATENTS

| | | |
|---|---|---|
| 734,434 | Schacht | July 21, 1903 |
| 1,175,624 | Fawkes | Mar. 14, 1916 |
| 2,542,871 | Johnson | Feb. 20, 1951 |
| 2,786,507 | Howe et al. | Mar. 26, 1957 |